United States Patent
Isaksson et al.

[11] Patent Number: 5,812,523
[45] Date of Patent: Sep. 22, 1998

[54] METHOD AND DEVICE FOR SYNCHRONIZATION AT OFDM-SYSTEM

[75] Inventors: Mikael Isaksson; Bo Engstroem, both of Lulea, Sweden

[73] Assignee: Telia AB, Farsta, Sweden

[21] Appl. No.: 413,423

[22] Filed: Mar. 30, 1995

[30] Foreign Application Priority Data

Mar. 1, 1995 [SE] Sweden .................................. 9500743

[51] Int. Cl.$^6$ ..................................................... H04J 11/00
[52] U.S. Cl. ........................ 370/208; 370/210; 370/516; 375/260; 375/344; 375/362; 375/210
[58] Field of Search .................................... 370/203, 206, 370/208, 210, 480, 497, 503, 516, 520; 375/200, 205, 208, 210, 260, 261, 267, 344, 347, 351, 362, 365, 366, 371, 373, 375, 376

[56] References Cited

U.S. PATENT DOCUMENTS

| | | | |
|---|---|---|---|
| 4,245,325 | 1/1981 | Kikuchi et al. | 370/23 |
| 5,313,169 | 5/1994 | Fouche et al. | 375/376 |
| 5,345,440 | 9/1994 | Gledhill et al. | 370/19 |
| 5,371,548 | 12/1994 | Williams | 348/478 |
| 5,444,697 | 8/1995 | Leung et al. | 370/19 |
| 5,450,456 | 9/1995 | Mueller | 370/21 |

*Primary Examiner*—Alpus H. Hsu
*Attorney, Agent, or Firm*—Oblon, Spivak, McClelland, Maier & Neustadt, P.C.

[57] ABSTRACT

A method of demultiplexing OFDM signals and a receiver for such signals. More particularly the method is concerned with synchronization in an OFDM receiver. A signal is read into a synchronization unit, in the time domain, i.e., before fourier transforming the signal by means of an FFT processor. In the synchronization unit, a frame clock is derived for triggering the start of the FFT process and for controlling the rate at which data is supplied to the FFT processor. For OFDM reception, it is vital that the FFT process commences at the right point in time. Once the frame clock has been recovered, a frequency error can be estimated by the synchronization unit. The frequency error is used to control; an oscillator which generates a complex rotating vector which is, in turn, multiplied with the signal to compensate for frequency errors. The method can be used both with OFDM systems in which symbols are separated by guard spaces, and with OFDM systems in which symbols are pulse shaped.

19 Claims, 8 Drawing Sheets

METHOD AND DEVICE FOR SYNCHRONIZATION AT OFDM-SYSTEM

BACKGROUND OF THE INVENTION

Field of the Invention

The present invention relates to a system for the transfer of information using orthogonal frequency division multiplexing (OFDM). In OFDM, signals are modulated using a suitable modulation technique such as phase shift keying (PSK).

OFDM is a technique suitable for use with time dispersive channels. At the present time it is planned to use OFDM as a transmission medium for large scale digital sound radio broadcasting, e.g. DAB, for HD-TV, high capacity services on copper cable and DMT line coding, which is essentially the same as OFDM.

Two variants of OFDM can be realised, in the first variant a guard space is provided between symbols and in the second variant symbols are pulse shaped. Where a guard space is used, part of the signalling interval is assigned as the guard space, and part of the symbol is repeated in the guard space. Where pulse shaping is employed, the side lobes from each symbol are, in the frequency domain, at least partially suppressed. This improves the reliability of detection when perfect synchronization cannot be guaranteed. The whole, or part of, a symbol is repeated and then multiplied with the pulse form.

In patent document WO 93/20267, a method and device is described which is intended for use in a digital transmission system. The invention makes use of repetitive synchronization patterns which may be included in transferred data, or placed in their own time slots. The received synchronization pattern is cross-correlated with a pre-stored version of the synchronization pattern. The cross-correlation produces a synchronization signal.

In patent document U.S. Pat. No. 3,883,729, there is described a device for frame correlation in a time multiplexed transmission system. The device consists of logical circuits for correlating an incoming signal with a signal which has been delayed. This enables use to be made of random repeating signals.

In patent document U.S. Pat. No. 5,363,415, there is described a "carrier regenerating device" intended for mobile satellite communications. According to the patent specification, unique signal sequences are placed periodically in the transmitted data. By cross-correlation with stored sequences, phase and frequency errors can be calculated.

In patent document U.S. Pat. No. 4,638,478, there is described the synchronization of frames in a TDM system. The synchronization is achieved by detecting blank intervals (guard spaces). This information is used to provide correct frame synchronization.

In patent document WO 93/11616, there is described a digital transmission process using OFDM.

In patent document U.S. Pat. No. 4,598,413, there is described a circuit for frame and phase synchronization of a local sampling clock. The synchronization is performed by cross-correlating a received unique synchronization sequence with a version stored in the receiver.

In patent document EP 608024, there is described a technique for synchronization in an OFDM receiver. A received sequence is subtracted from a sequence which is delayed by one block length.

In patent document U.S. Pat. No. 5,148,451, there is described a device for carrier retrieval in a mobile satellite communications system. Unique synchronization words are placed periodically in the transmitted signal. A cross-correlation circuit calculates the cross-correlation between the received signal and a known, stored sequence.

In summary, it is known to cross-correlate an incoming signal with a locally stored signal. It is also known to use a delayed signal in which a pattern is placed at certain positions in the protocol intended for synchronization. Furthermore, it is known to use guard spaces for synchronization.

SUMMARY OF THE INVENTION

In known methods for synchronization, special signal synchronization blocks, or training sequences, are used. The use of such sequences reduces the information carrying capacity of a signal. In order to make efficient use of the available channel capacity, it is desirable to use a synchronization technique that does not require the use of training sequences, or synchronization blocks. It should, however, be noted that information redundancy and hence signal repetition may be present, for e.g., error detection and correction. It is also desirable to ensure that synchronization techniques are independent of present and future standards which relate to OFDM systems.

The present invention seeks to overcome these problems.

The present invention relates to a method of demultiplexing an OFDM signal and a receiver for OFDM signals, and more particularly to a technique for synchronization in OFDM systems. A received OFDM signal is digitized in an A/D convertor (analog to digital converter). The digitized signal is read into a synchronization unit. The synchronizing signal derived from the synchronization unit is then used to set the frame clock.

In a further development of the invention, the signal includes symbols which are partly repeated. The signal is cross-correlated so that the repeated portions of the symbols give a positive value. The cross-correlation is calculated by multiplication and generation of a moving average (sliding mean).

In order to perform the cross-correlation, a copy of the OFDM signal is delayed by a symbol length in a separate branch. Thus the two signals are aligned in time so that the cross-correlation can be calculated in a serial fashion.

The complex conjugate of the signal is multiplied with the delayed signal to create a second signal. The second signal is shifted by the number of sample intervals corresponding to the length of the repeated portion of the signal and the result is subtracted from the second signal to form a third signal. The third signal is integrated to give a fourth signal, which is a cross-correlation sequence. The absolute value of the fourth signal is derived. This is periodic with the OFDM frame length and is used as the input to a phase locked loop that generates the frame clock.

The frequency error in the system is determined by calculation of the phase of the fourth signal when the cross-correlation is at its maximum. The phase shift per sample of the cross-correlation signal is proportional to the frequency error in the original signal. Thus, the frequency error can be computed as a function of the phase and the number of samples per symbol.

The invention also relates to a device for synchronizing an OFDM system. The synchronizing unit is arranged to receive a digitized version of the OFDM signal. The synchronizing unit performs a correlation operation on the signal, and generates a synchronizing signal. The synchronization is performed before an FFT operation is carried out on the signal. The synchronizing unit is arranged to send a frame clock signal to an FFT processor. The synchronizing unit also sends a frequency signal to an external device which is used for frequency correction. The signal includes a symbol L, representing one, or more, bits of user data, which is at least partially repeated within the signalling interval. The complex conjugate of the OFDM signal is derived and multiplied by a multiplying unit with the OFDM signal delayed by the length of the symbol L. In the repeated portion, R, the complex conjugate is multiplied by the corresponding part of the symbol L, giving a positive output to the multiplication. In the portion L, the complex conjugate is multiplied by non-repeated data. A device for generating a sliding mean is arranged to produce a synchronization signal from a signal M, derived from the multiplying unit. The sliding mean generating unit comprises a shift register arranged to shift the signal, M, a number of steps, corresponding to the length of the repeated signal R. The result is subtracted from the original signal, M, to give a signal, C, which is integrated in an integrating unit. The synchronizing unit is arranged to calculate the absolute value of the signal C. A signal, T, comprising a sequence of triangular signals is produced. This signal is used to produce a frame clock signal for the FFT processor. The frequency error is determined, in the synchronizing unit, by determining the phase of the cross-correlation. The phase is proportional to the frequency error, which is preferably measured at a correlation maxima.

According to a first aspect of the present invention, there is provided a method of demultiplexing an OFDM signal, including the steps of:

digitizing the OFDM signal;

deriving a frame clock from the OFDM signal;

synchronizing a fast fourier transform analysis with the frame clock;

compensating for a frequency error in the OFDM signal by using a frequency error signal; and performing a fast fourier analysis with the frame clock.

Preferably the frame clock and frequency error signal are derived by cross-correlation between a symbol and a repeated portion thereof, falling within a guard space.

Alternatively the OFDM signal is modulated with a stream of symbols in which part of a symbol is repeated adjacent the symbol, and:

a complex conjugate of the OFDM signal is calculated;

the complex conjugate is multiplied by the non-conjugated original OFDM signal, delayed by a symbol length, to give a second signal;

said second signal is delayed by a number of sample intervals corresponding to the repeated part of said symbol;

the delayed second signal is subtracted from the second signal, to create a third signal; and said third signal is integrated to generate a fourth signal which is a filtered cross-correlation sequence.

According to a second aspect of the invention there is provided an OFDM receiver, arranged to demultiplex an OFDM signal, said OFDM receiver including an A/D convertor, for digitizing said OFDM signal, synchronization means for performing a cross-correlation of said OFDM signal, a phase lock loop producing a synchronized digitized OFDM signal, and a FFT processor, arranged to receive said synchronized digitized OFDM signal.

Preferably said synchronization means generates a frame clock, which frame clock drives said FFT processor.

Preferably said synchronization means generates a frequency error signal by cross-correlation, said frequency error signal being used to compensate for a frequency error in the OFDM signal.

Preferably said synchronization means comprises, a symbol length delay line for forming a copy of the OFDM signal, conjugation means for forming a complex conjugate of the non-delayed OFDM signal, a multiplier, for multiplying said complex conjugate with a corresponding part of the delayed OFDM signal, averaging means for forming a sliding mean of an output of said multiplier, from which sliding mean is generated a synchronization signal comprising the frame clock and the frequency error signal.

According to a third aspect of the invention there is provided a system for the transmission and reception of OFDM data signals including an OFDM receiver, demultiplex an OFDM signal, said OFDM receiver including an A/D convertor, for digitizing said OFDM signal, synchronization means for performing a cross-correlation of said OFDM signal, thereby producing a synchronized digitized OFDM signal and a FFT processor, arranged to receive said synchronized digitized OFDM signal and to demultiplex said synchronized digitized OFDM signal.

According to a fourth aspect of the present invention there is provided a system for the transmission and reception of OFDM data signals in which said OFDM data signals are demultiplexed according to a method which includes the steps of:

digitizing the OFDM signal;

deriving a frame clock from the OFDM signal;

synchronizing a fast fourier transform analysis with the frame clock;

compensating for a frequency error in the OFDM signal by using a frequency error signal; and performing a fast fourier analysis synchronized with the frame clock.

DETAILED DESCRIPTION OF THE PREFERRED EMBODIMENTS

Figure 1:
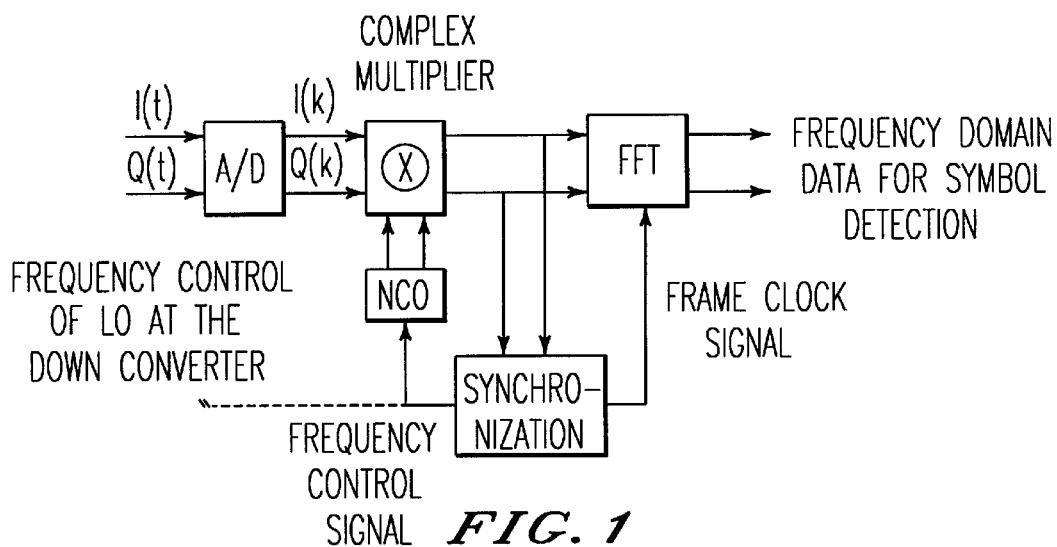
FIG. 1 illustrates the functional units of an OFDM receiver, according to the present invention.

FIG. 1 illustrates the synchronization operation in an OFDM receiver, according to the invention. The received complex time domain baseband signals are, I(t) and Q(t). The incoming OFDM signal is digitized by the A/D convertor, to a digital signal representing the incoming OFDM signal. The digital signal is read into the synchronization block in the time domain, i.e. before it is subject to a fast fourier transform operation by the FFT processor. It should be noted that FFT stands for fast fourier transform, and this technique is extensively described in the literature. In the synchronization block, the clock used to determine the start of the data to be read into the FFT processor is retrieved. For OFDM reception, it is extremely important that the start point of the data, to be used in a FFT calculation, is correct, if the incoming signal is to be effectively demultiplexed. The initial reading point for the FFT processor is, therefore, adjusted in relation to the retrieved frame clock.

When the frame clock has been retrieved, the frequency error (i.e., the difference between receiver and transmitter clock) can be estimated. This function is also performed in the synchronization block. The frequency error is used to control a feedback loop which includes a NCO (numerically controlled oscillator) having a digital output. The NCO generates a complex rotating vector which is multiplied with the incoming digitized signal, in order to compensate for the frequency error. An alternative, to this method of digitally correcting the incoming data signal, is to control the local oscillators which are used for down mixing from radio frequencies (the RF portion of the OFDM receiver is not shown in the drawings). As described, the synchronization method is focused on the estimation of the frame clock and frequency error. Use of these parameters requires control functions of the phase lock loop (PLL) type, as are used in all synchronization methods. Part of the information in the OFDM signal is repeated during each signalling interval. This repetition of information is a common feature of most OFDM systems. There are two principle variants of OFDM in which redundant data is available for use in synchronization, namely:

OFDM signals which incorporate a guard space, between symbols, in which data is repeated; and OFDM signals which are pulse shaped.

Figure 2:
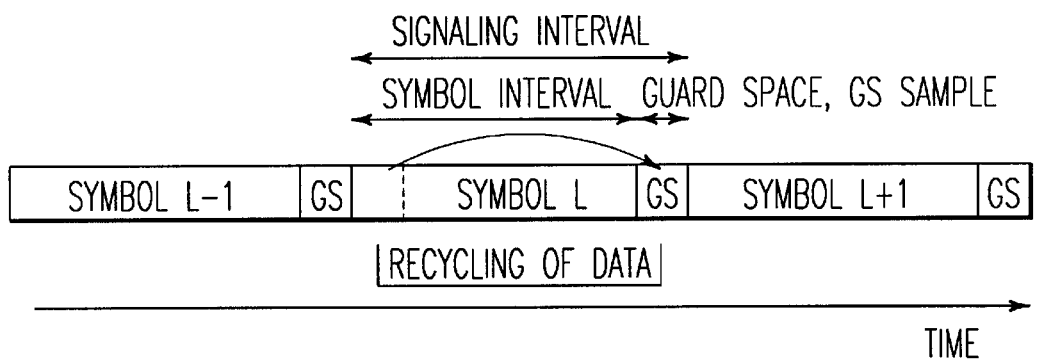
FIG. 2 illustrates the signal structure of an OFDM signal employing guard spaces between symbols.

In most existing OFDM systems, a guard space is used between symbols, see FIG. 2. The guard space is intended to allow for time dispersion between two adjacent symbols, and to allow for delays between detectable transmitters (Simulcast network). If a 1024 point FFT is used, each symbol is sampled 1024 times. The output of the FFT operation gives the 1024 different carriers, each representing several bits. The precise number depends on the modulation technique used. The number of samples taken, during a guard space, can vary. The guard space is filled, in the time domain, with repeated data, i.e. the first part of the symbol. Because the FFT operation is cyclic, the start point for sampling of symbols can vary, within the guard space, without loss of any information.

In the second variant of OFDM, in which the symbols are pulse shaped, the side lobes for each symbol, in the frequency domain, are suppressed. In practice, the whole, or part, of a symbol is repeated and then multiplied with the pulse shape.

Figure 3:
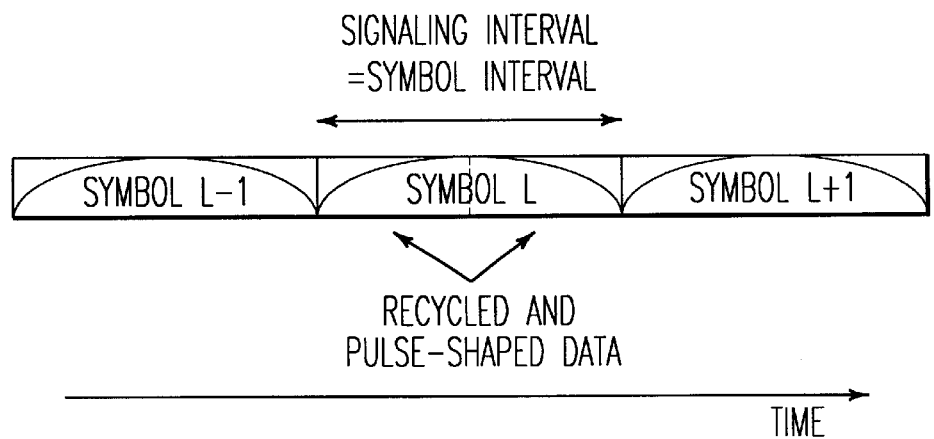
FIG. 3 illustrates the signal structure of an OFDM signal employing pulse shaping.

FIG. 3 shows the signalling interval where pulse shaping is used. The transition between two symbols is "soft", as a result of pulse shaping the symbols. This results in side lobe suppression. Elsewhere in the drawings, the symbols are, for convenience, shown as rectangular.

The essential feature of pulse shaping, from the point of view of synchronization, is that data, in the transmitted signal, is repeated within the signalling interval.

The synchronisation method of the present invention is based on continuous correlation, between samples separated in time by a repeat distance N, where N is the symbol length. The cross-correlation implies that during that part of the signal interval which is repeated (correlated), the data gives a positive contribution to the cross-correlation. The cross-correlation is calculated by multiplication and creation of a moving average value, or sliding mean.

Figure 4:
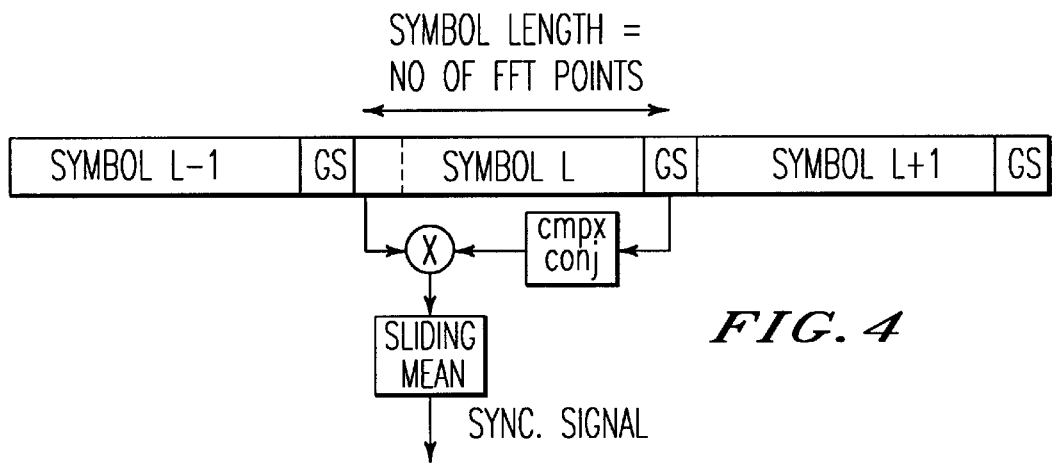
FIG. 4 illustrates the production of a synchronization signal by cross-correlation for an OFDM signal employing guard spaces between symbols.

FIG. 4 shows the length of a symbol as being equal to the number of FFT sample points. FIG. 4 shows that part of the beginning of symbol L, is repeated in the guard space, GS. To perform the cross-correlation, the signal is split into two branches. In one branch the signal is delayed by a symbol length and in the other branch the signal is not delayed. The complex conjugate of the non-delayed signal is multiplied by the delayed signal to create a second signal. The second signal is also split into two branches. In one branch the signal is delayed by the number of sample intervals corresponding to the length of the repeated portion of the signal and the result is subtracted from the non-delayed signal to form a third signal. The third signal is integrated to form a fourth signal which is a cross-correlation sequence. This operation is equivalent to forming a sliding mean of the result of the multiplication. The synchronisation signal is produced from the cross-correlation sequence.

Figure 5:
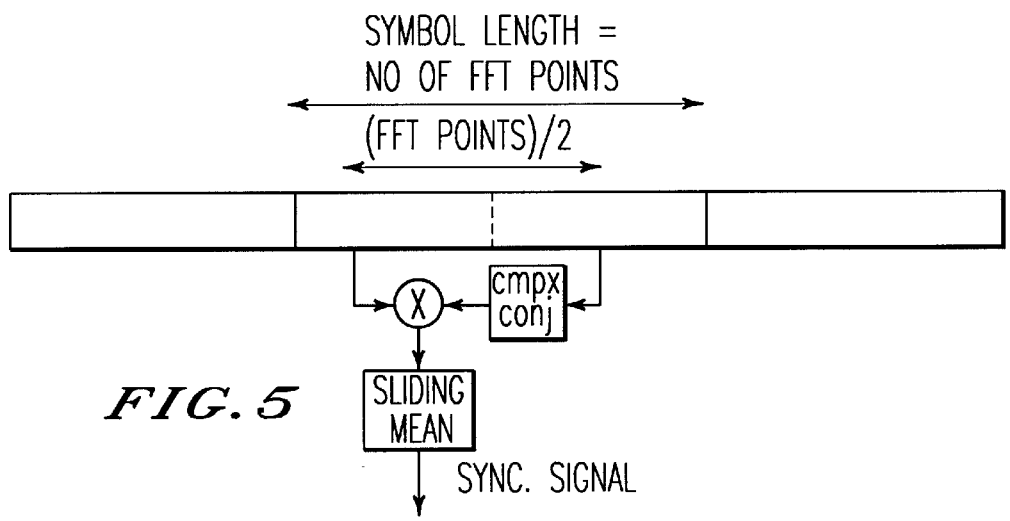
FIG. 5 illustrates the production of a synchronization signal by cross-correlation for an OFDM signal employing pulse shaping.
Figure 6:
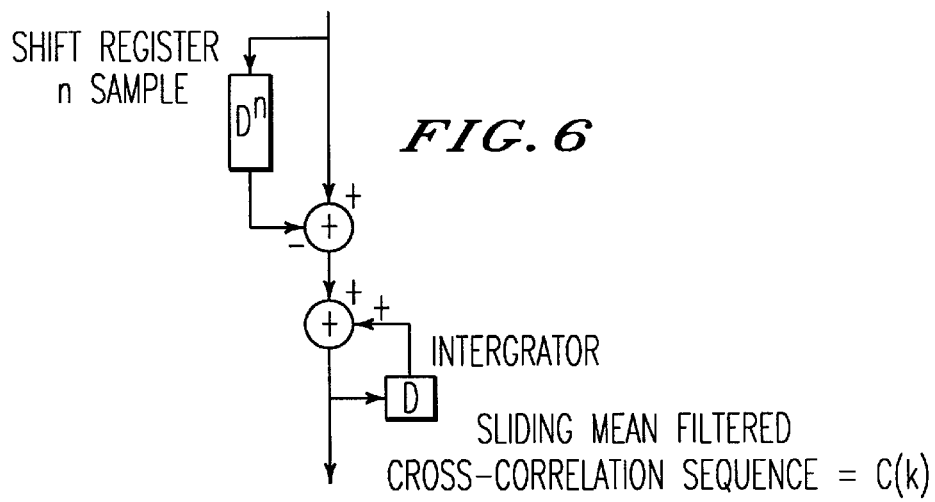
FIG. 6 illustrates a device for forming a sliding mean.

FIG. 5 shows the system used with a pulse shaped OFDM signal. In this case the length of the symbol corresponds to the number of FFT sample points. Half the symbol length is used for the symbol, and half the length for repeated data. This implies that the same information is repeated in its entirety within the symbol length. Again the signal is split into two branches. In one branch the signal is delayed by a symbol length and in the other branch the signal is not delayed. The complex conjugate of the non-delayed signal is multiplied by the delayed signal to create a second signal. The second signal is also split into two branches. In one branch the signal is delayed by the number of sample intervals corresponding to the length of the repeated portion of the signal and the result is subtracted from the second signal to form a third signal. The third signal is integrated to form a fourth signal which is a cross-correlation sequence. This is equivalent to forming a sliding mean from which the synchronization signal is derived and used for controlling the FFT processor. The way in which the sliding mean is derived is illustrated in FIG. 6. The output signal from the sliding mean generator is described as C(k) being equal to the sum from k equal to minus infinity to infinity $$\overline{s}(k)s(k-N)-\overline{s}(k-N)s(k-N-n)$$

$\overline{s}$=complex conjugate, where s(k) is the sampled complex OFDM-signal, N is the repeating distance and n is the number of samples included in the sliding mean. In the case of OFDM with guard space, N is equal to the number of FFT sample points and n is equal to the number of FFT sample points in the guard space. In the case of OFDM with pulse shaping, N is (the number of FFT sample points)/2, and n is equal to N. The time dependency of the digitised signal is represented by the integer series, k.

Figure 7:
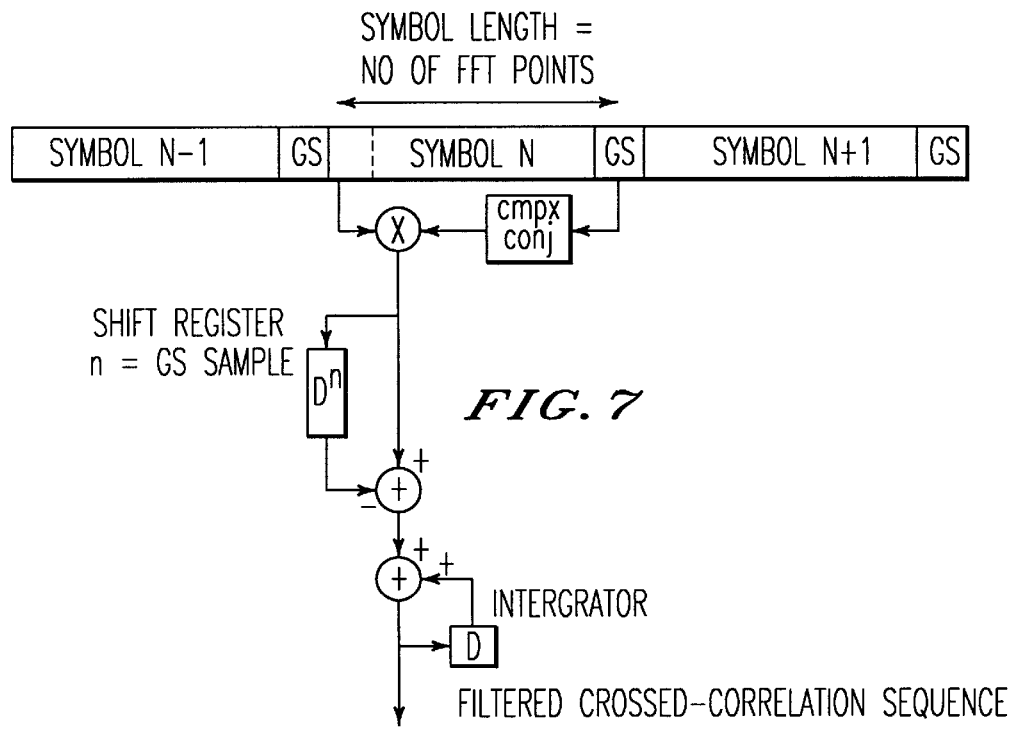
FIGS. 7 shows the combination of the device, illustrated in FIG. 4, with the device illustrated in FIG. 6.
Figure 8:
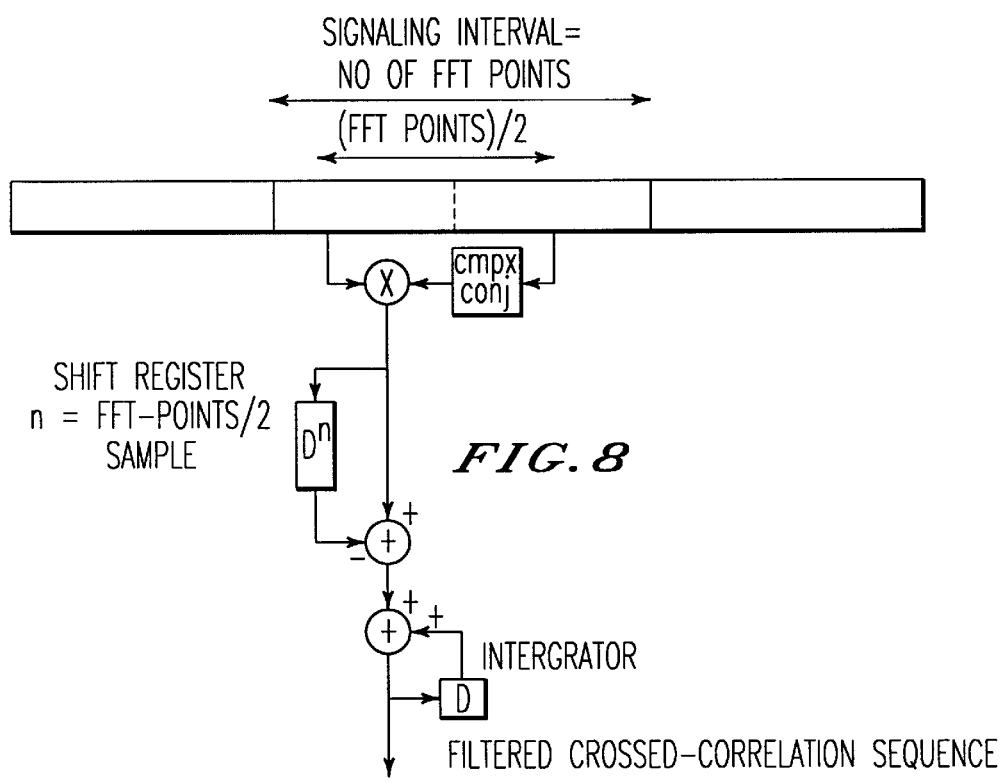
FIG. 8 shows the combination of the device, illustrated in FIG. 5, with the device illustrated in FIG. 6.

Synchronization units which include the use of sliding averages are illustrated in FIGS. 7 and 8, respectively, for the two variants, guard space and pulse shaping.

The result obtained, by multiplication of the complex conjugate of the original signal with the delayed original signal, using the apparatus illustrated in FIGS. 4 and 5, is read into the shift register shown in FIG. 6. In the shift register the signal is shifted n times, and the resulting signal is then subtracted from the unshifted signal. In this manner, the resultant signal is added to a signal which is shifted by one step. The signal is thus integrated. The final result is a filtered sliding mean cross-correlation sequence equal to C(k). In FIGS. 7 and 8 the whole process is illustrated, FIGS. 7 and 8 representing a combination of FIGS. 4 and 6, and a combination of FIGS. 5 and 6, respectively.

Figure 9A:
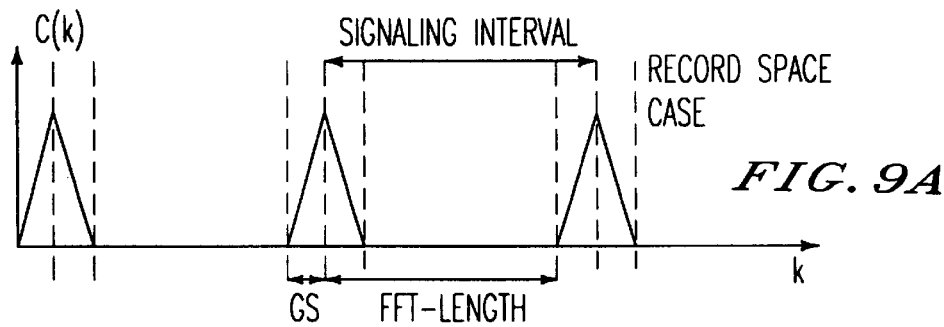
FIG. 9A and 9B show the result of applying a sliding cross-correlation.
Figure 9B:
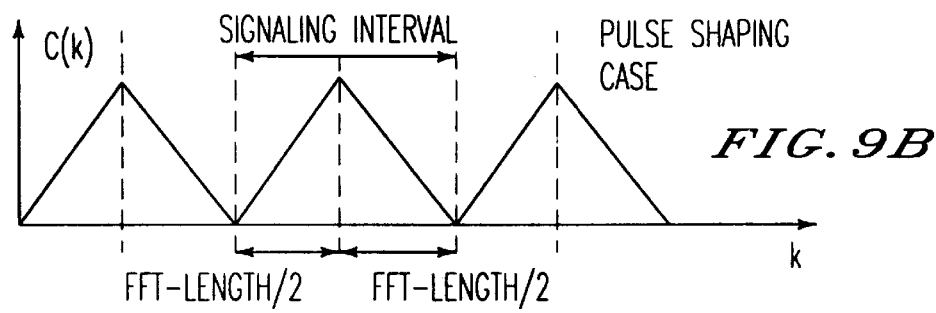

FIGS. 9A and 9B show the absolute value of the output signal C(k), for the two variants, OFDM with guard space, and OFDM with pulse shaping, respectively. It is essential to take the absolute values of C(k) since it is independent of the phase.

The calculation of the absolute value of filtered signal C(k) gives a saw tooth signal, as shown in FIG. 9, which is ideal for driving a PLL (Phase Lock Loop) for the generation of a frame clock to be used by the FFT processor.

The frequency error can easily be calculated from the cross-correlation by calculating the phase where the cross correlation has its maximum. The received signal s'(k) with frequency error can be expressed as:

$$s'(k)=e^{j\omega k}\cdot s(k)$$

where ω is the frequency error, and j notation is used for the representation of complex numbers.

The multiplier output, p(k), is given by:

$$p(k)=e^{j\omega k}\cdot s(k)\cdot e^{j\omega(N-k)}\overline{s(k-N)}$$

which can be simplified to:

$$p(k)=e^{j\omega N}\cdot s(k)\cdot\overline{s(k-N)}$$

It is to be noted that the time dependency, k, has disappeared from the expression. Consequently the phase shift of the cross correlation is directly proportional to the frequency error ω multiplied by N. The bigger the repeating distance N, the bigger the phase shift due to the frequency error, which implies that the maximum frequency error that can be detected is:

$$|N\omega|<\pi \text{rad}.$$

or that the frequency error must not exceed $$|f_e|<\frac{f_s}{2N}$$

where $f_e$ is the frequency error in Hz, and $f_s$ is the sampling frequency in Hz.

The frequency error can, in principle, be measured at any time within the repeating interval, but to achieve the best estimation it should be performed at cross-correlation maxima when the phase at that point is based on a sliding mean created from a large number of samples.

Figure 10:
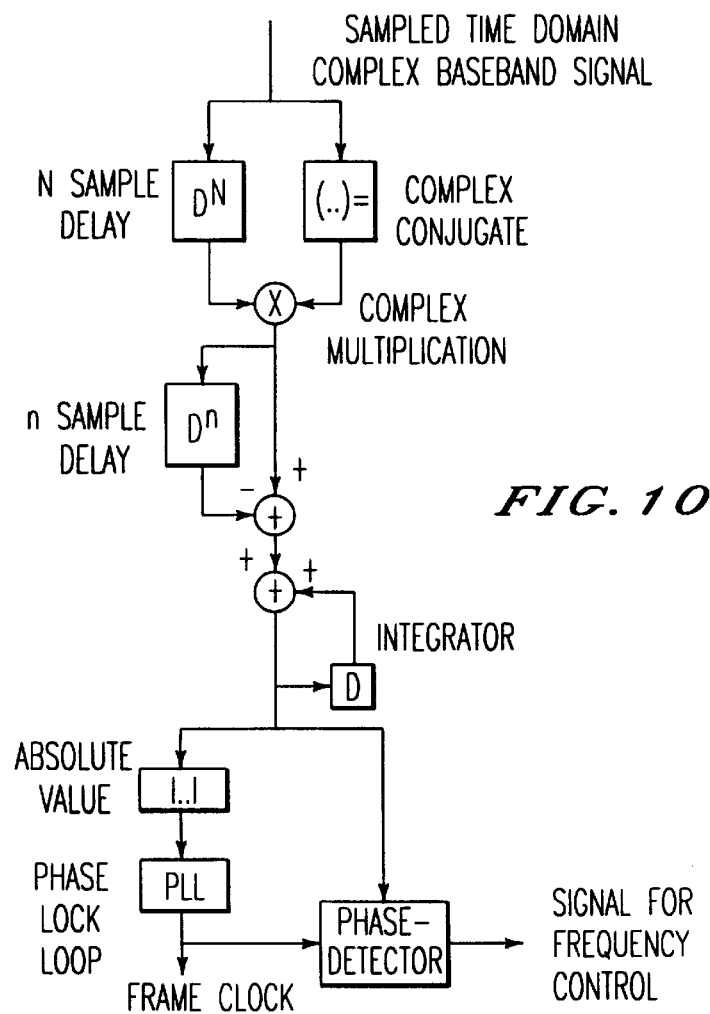
FIG. 10 illustrates an embodiment of a synchronization device, according to the present invention.

A unit for generation of synchronization signals is shown in FIG. 10. The sampled complex OFDM signal is split into two branches. In one of the branches the sample of the signal, with a repeating distance, N, is delayed in a shift register. The shift register can be implemented by FIFO memories, or double ported RAM memories. The other branch of the signal is converted to its complex conjugate, i.e. the imaginary part changes sign. The two branches are then multiplied together in a complex multiplier.

The output signal from the multiplier is again split into two branches. One branch is delayed in a shift register by n samples (the number of samples in the sliding mean). The two signals are subtracted and integrated to form a filtered signal. The frame clock is retrieved from the absolute value of the filtered signal and this function is performed before the digitised signal is fed to the FFT processor. There are various ways of simplifying the calculation of the absolute value by avoiding the need for further signal multiplications.

Referring now to FIG. 10, the phase lock loop unit retrieves the frame clock, i.e. generates control signals for the FFT processor, indicating the point in time where it is to start sampling the OFDM symbol. The phase detector unit calculates the phase for the correlation maxima (synchronously with the frame clock). Consequently, the peak detector unit is triggered directly by the frame clock and calculates the phase at this point in time. The phase is thus directly proportional to the frequency error.

Phase detection is performed only once in each signalling interval. It is, however, important that it is performed at the point in time when correlation maximum occurs, because maximal precision of the phase is given at this point in time. Phase detection can be performed in different ways, for instance with a Pythagorean processor, look-up table in EPROM, or with a signal processor.

The phase (frequency error) operates as an input signal to a simple feedback loop for controlling the frequency.

Figure 11:
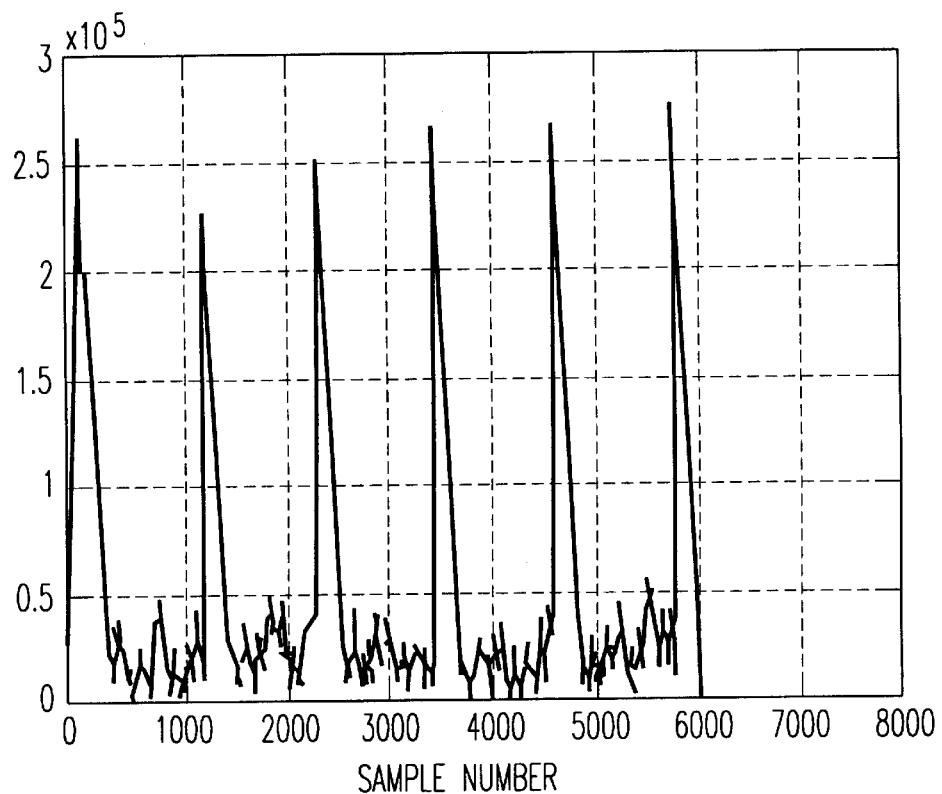
FIG. 11 shows the absolute values of a cross-correlation, performed over six signal intervals, for an OFDM signal with guard spaces.
Figure 12:
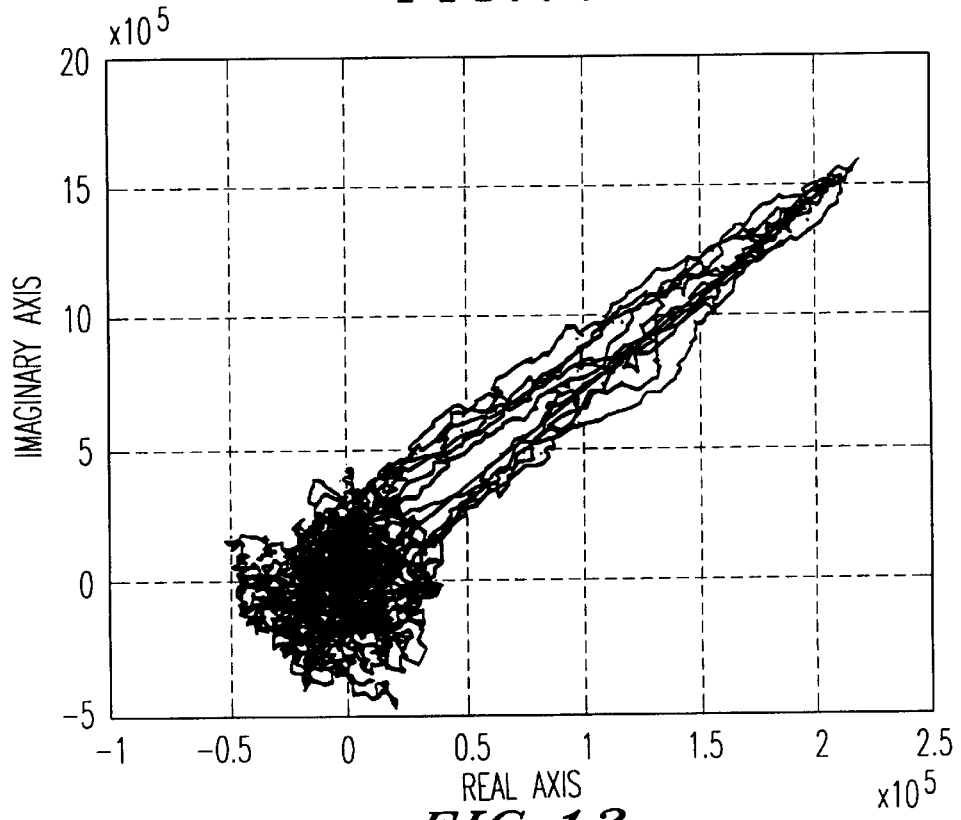
FIG. 12 shows a filtered signal in the complex number plane for OFDM with guard space.
Figure 13:
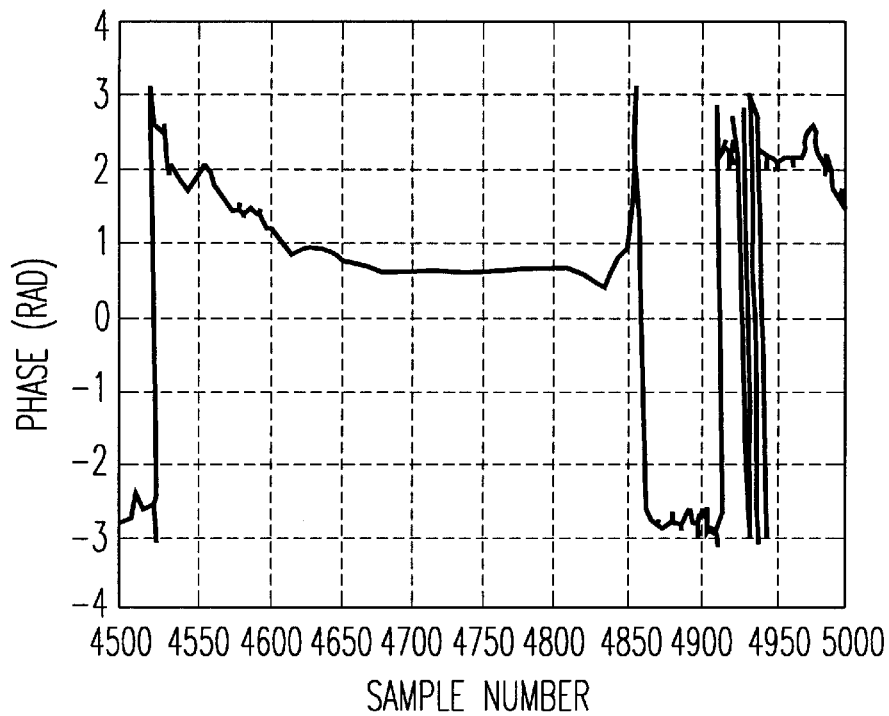
FIG. 13 shows the phase variation, within a signalling interval for OFDM, with guard space.
Figure 14:
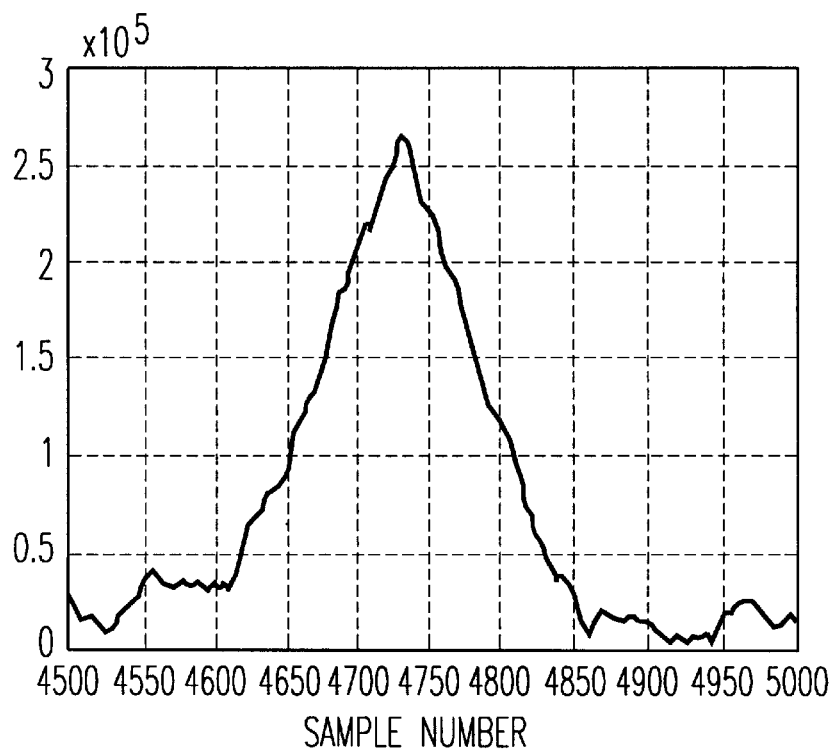
FIG. 14 shows the absolute value of a filtered signal, within a signal interval for OFDM, with guard space.

One of the biggest advantages of the method is that little complexity is demanded in the realisation of the hardware. The hardware requirements are:

one complex multiplier two complex adders two shift registers one phase detector logic for calculation of approximate absolute value FIG. 11 shows the absolute value of a filtered signal. The signal also contains a positive frequency error, which is not evident from the absolute value. The Figure shows the result at synchronization of an OFDM signal containing guard spaces, where the number of FFT points is 1024, the number of samples in the guard space is 128 and the modulation technique used is QPSK (quadrature phase shift keying). FIG. 12 shows the filtered signal in the complex number plane for the case of OFDM with guard spaces. If the eight signal intervals in the complex number plane are studied, the phase shift due to the frequency error contained in the signal will be evident. In FIGS. 13 and 14 there is shown a magnification of an interval containing a cross-correlation maximum. From FIG. 13 it is evident how the phase is integrated up to the point where the filtered signal has its maximum. The phase detection must be made at this point in time to give maximal precision and reliability. It is to be observed that the time scale is identical to that in FIGS. 13 and 14.

Figure 15:
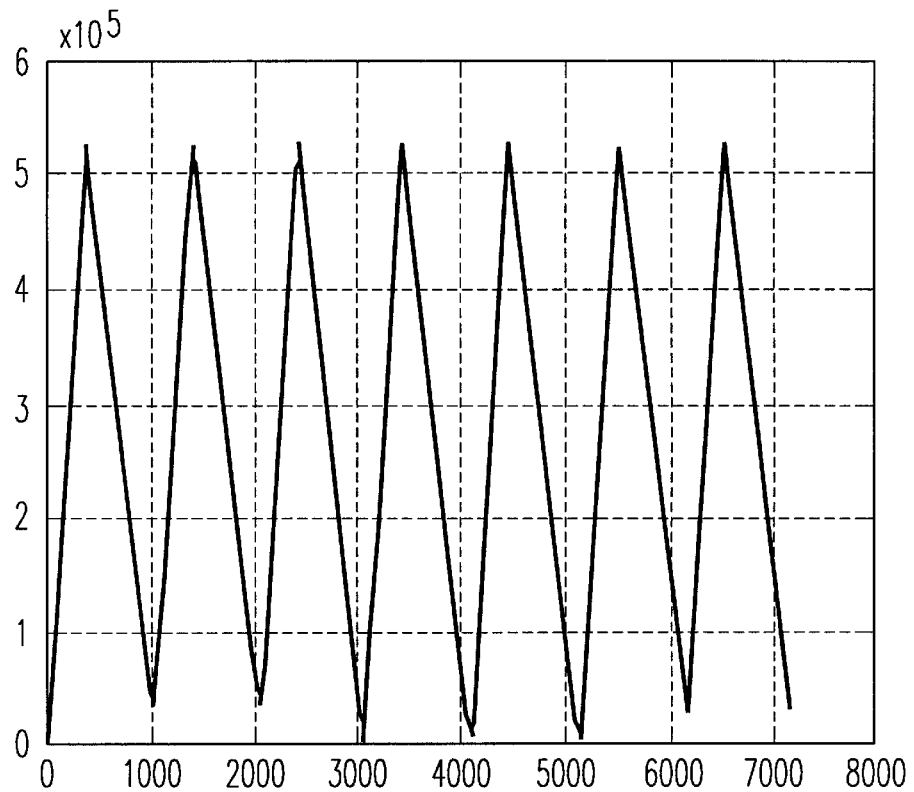
FIG. 15 shows the absolute value of a filtered signal for OFDM, with pulse shaping.
Figure 16:
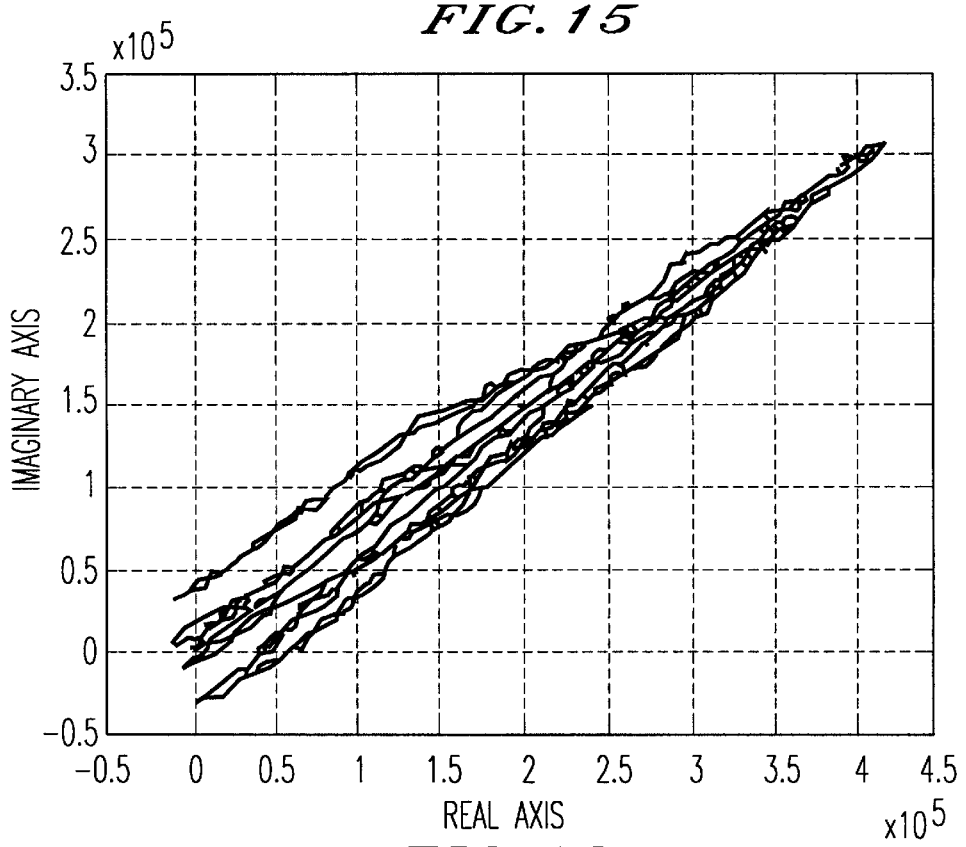
FIG. 16 shows a filtered signal in the complex number plane for OFDM, with pulse shaping.

In FIG. 15 there is shown the absolute value of an OFDM signal with pulse shaping, at synchronization. In this case, a 1024 point FFT has been used on a QPSK modulated OFDM signal. FIG. 11 shows the absolute value of the filtered signal over seven signal intervals. The signal also contains a positive frequency error which is not evident from the absolute value. If the seven signal intervals in the complex number plane of FIG. 16 are studied, the phase shift, depending on the frequency error influencing the signal, will be evident. From a comparison with the guard space case, it will be obvious that the phase, in principle, is constant within the signalling interval. However, maximal precision is achieved at correlation maximum.

Figure 17:
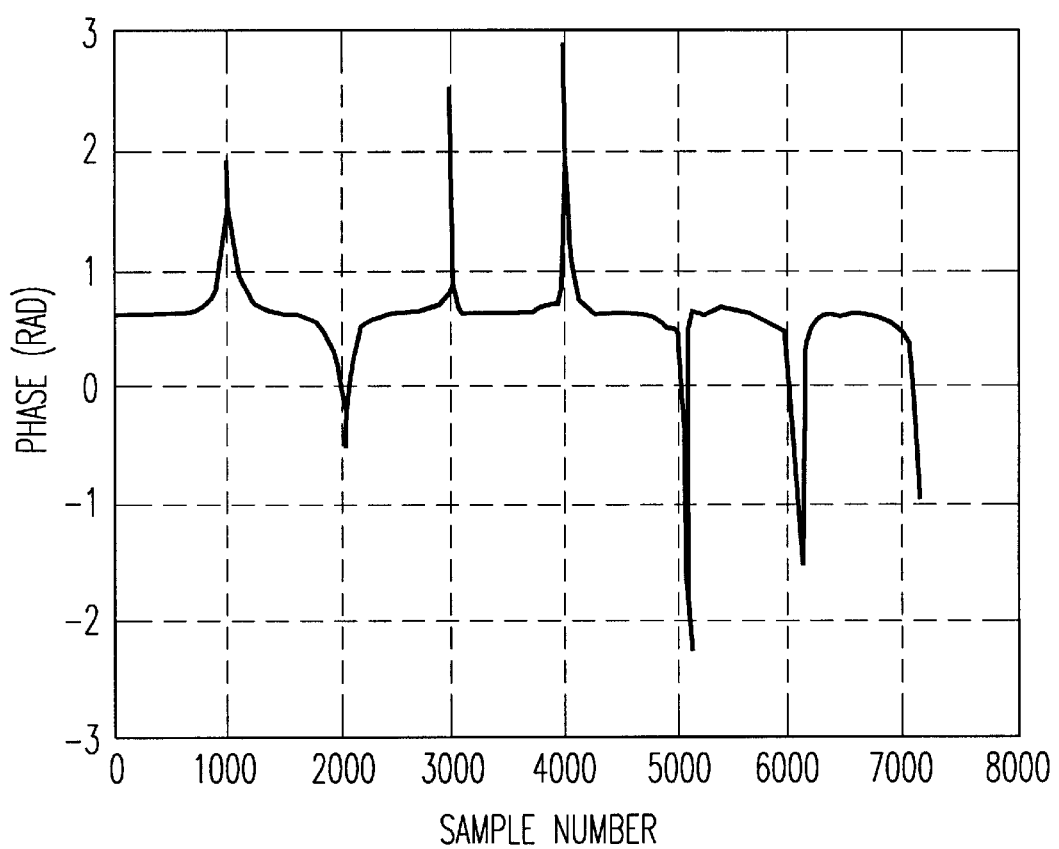
FIG. 17 shows the phase variation, for seven signalling intervals for OFDM, with pulse shaping.

FIG. 17 shows the phase shift over seven signalling intervals.

The invention is not limited to the above description, but may be subject to modifications within the scope of the patent claims when read in the light of the description.

What is claimed as new and desired to be secured by Letters Patent of the United States is:

1. A method of demultiplexing an OFDM signal, the method comprising the steps of:
    digitizing the OFDM signal;
    deriving a frame clock from the OFDM signal;
    synchronizing a fast fourier transform analysis with the frame clock;
    compensating for a frequency error in the OFDM signal by using a frequency error signal; and
    performing the fast fourier analysis synchronized with the frame clock.

2. The method as claimed in claim 1, further comprising the step of modulating the OFDM signal with a stream of symbols, including repeating part of each symbol of the stream of symbols adjacent to the each symbol.

3. The method as claimed in claim 2, wherein the step of modulating comprises separating each symbol of the stream of symbols from the adjacent symbol by a guard space, and wherein the steps of deriving the frame clock and compensating for the frequency error signal are by cross-correlation between the stream of symbols and repeated portions thereof, falling within said guard space.

4. The method as claimed in claim 3, wherein the step of synchronizing comprises delaying a copy of the OFDM time domain signal by a symbol length so that samples to the cross-correlated are aligned in time.

5. The method as claimed in claim 4, the step of synchronizing comprises producing, by multiplication and calculation of a sliding mean, a cross-correlation signal from which said frame clock and said frequency error are derived.

6. The method as claimed in claim 5, wherein the step of synchronizing comprises: delaying the OFDM signal by a signal length;
    calculating a complex conjugate of the OFDM signal;
    multiplying the complex conjugate by the delayed OFDM signal to give a second signal;
    delaying said second signal by a number of sample intervals corresponding to the repeated part of said symbol;
    subtracting the delayed second signal from the second signal, to create a third signal; and
    integrating said third signal to generate a fourth signal which is filtered cross-correlation sequence.

7. The method as claimed in claim 6, further comprising the steps of calculating an absolute value of said fourth signal to obtain a periodic signal; and utilizing maximum absolute values of said fourth signal as said frame clock.

8. The method as claimed in claim 6, wherein the step of compensating for the frequency error signal comprises determining the frequency error signal by calculating the cross-correlation phase when the cross-correlation is at a maximum.

9. A method as claimed in claim 8, wherein the step of determining the frequency error signal comprises determining the cross-correlation phase proportionally to the symbol length and the frequency error.

10. A system for the transmission and reception of OFDM data signals in which said OFDM data signals are demultiplexed according to a method as claimed in claim 1.

11. An OFDM receiver, arranged to demultiplex an OFDM signal, said OFDM receiver comprising:
    an A/D convertor for digitizing said OFDM signal,
    synchronization means for performing a cross-correlation of said OFDM signal and for outputting a frame clock,
    a phase locked loop for producing a synchronized digitized OFDM signal, and
    a FFT processor, arranged to receive said synchronized digitized OFDM signal based on said frame clock and to demultiplex said synchronized digitized OFDM signal based on said frame clock.

12. An OFDM receiver as claimed in claim 11, wherein said synchronization means comprises a generator for generating a frame clock, said frame clock driving said FFT processor.

13. An OFDM receiver as claimed in claim 11, wherein said synchronization means comprises a generator for generating a frequency error signal by cross-correlation, the frequency error signal being used to compensate for a frequency error in the OFDM signal.

14. An OFDM receiver as claimed in claim 11, wherein said synchronization means comprises:
    a symbol length delay line for forming a delayed OFDM signal,
    conjugation means for forming a complex conjugate of the OFDM signal that has not been delayed,
    a multiplier for multiplying said complex conjugate with a corresponding part of the delayed OFDM signal,
    averaging means for forming a sliding means of an output of said multiplier, the sliding mean being used to generate a synchronization signal including the frame clock and the frequency error signal.

15. An OFDM receiver as claimed in claim 14 wherein the averaging means comprises:
    a shift register for shifting an input signal by a number of steps corresponding to a repeat length of a symbol,
    substraction means for subtracting the shifted input signal from the input signal, and
    integrating means for integrating an output from said subtraction means.

16. An OFDM receiver as claimed in claim 15, wherein said synchronization means comprises:
    an absolute value means for calculating an absolute value of an output of said integrating means, an output of said absolute value means comprising a sequence of triangular pulses from which said frame clock is derived, said frame clock being used to drive said FFT processor.

17. An OFDM receiver as claimed in claim 16, wherein said synchronization means generates said frequency error signal by determining a cross-correlation phase.

18. An OFDM receiver as claimed in claim 17, wherein said synchronization means generates said frequency error signal at a cross-correlation maximum.

19. A system for the transmission and reception of OFDM data signals including an OFDM receiver as claimed in claim 11.

* * * * *

UNITED STATES PATENT AND TRADEMARK OFFICE
CERTIFICATE OF CORRECTION

PATENT NO. : 5,812,523
DATED      : September 22, 1998
INVENTOR(S): Mikael ISAKSSON, et al.

It is certified that error appears in the above-identified patent and that said Letters Patent is hereby corrected as shown below:

On the title page, item [54], and on top of column 1, the title should be:

--METHOD AND DEVICE FOR SYNCHRONIZATION OF AN OFDM-SYSTEM--

Signed and Sealed this

Eighteenth Day of May, 1999

*Attest:*

*Attesting Officer*

Q. TODD DICKINSON

*Acting Commissioner of Patents and Trademarks*